(12) United States Patent
Tucker et al.

(10) Patent No.: US 11,914,932 B2
(45) Date of Patent: Feb. 27, 2024

(54) USER-ASSISTED PARTS PACKING OPTIMIZATION

(71) Applicant: Hewlett-Packard Development Company, L.P., Spring, TX (US)

(72) Inventors: David Tucker, Vancouver, WA (US); Nicholas Saunders, Vancouver, WA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 469 days.

(21) Appl. No.: 16/978,281

(22) PCT Filed: Apr. 27, 2018

(86) PCT No.: PCT/US2018/029921
§ 371 (c)(1),
(2) Date: Sep. 4, 2020

(87) PCT Pub. No.: WO2019/209333
PCT Pub. Date: Oct. 31, 2019

(65) Prior Publication Data
US 2021/0039320 A1 Feb. 11, 2021

(51) Int. Cl.
*G06F 30/12* (2020.01)
*G06F 30/20* (2020.01)
(Continued)

(52) U.S. Cl.
CPC .............. *G06F 30/20* (2020.01); *B22F 10/20* (2021.01); *B22F 10/80* (2021.01); *B33Y 50/00* (2014.12); *G05B 19/4099* (2013.01); *G06F 30/12* (2020.01); *G05B 2219/49007* (2013.01); *G05B 2219/49008* (2013.01); *G05B 2219/49023* (2013.01); *G06F 2111/04* (2020.01); *G06F 2113/10* (2020.01)

(58) Field of Classification Search
CPC ...... G06F 30/20; G06F 30/12; G06F 2111/04; G06F 2113/10; B33Y 50/00; B22F 10/20; B22F 10/80; G05B 19/4099; G05B 2219/49007; G05B 2219/49008; G05B 2219/49023
See application file for complete search history.

(56) References Cited

U.S. PATENT DOCUMENTS 9,636,872 B2 * 5/2017 Batchelder ............ G05B 15/02
10,696,038 B2 * 6/2020 Thomas-Lepore .... B33Y 50/02
(Continued)

FOREIGN PATENT DOCUMENTS

WO WO-2017075258 5/2017

*Primary Examiner* — Kibrom K Gebresilassie
(74) *Attorney, Agent, or Firm* — Shook, Hardy & Bacon L.L.P.

(57) ABSTRACT

A parts packing method is used to optimize build bed part placement for additive manufacturing. The method includes a user interface to parts packing software, enabling a process engineer to select parts from a pool of parts, group parts to have uniform orientation, and specify a range of angles and rotation of the parts. Additionally, the user interface accepts input related to process variations among different printers as well as drift over time of a single printer. The user interface feeds the data into the parts packing program to optimize build bed part placement.

16 Claims, 11 Drawing Sheets

(51) Int. Cl.
*B33Y 50/00* (2015.01)
*G05B 19/4099* (2006.01)
*B22F 10/20* (2021.01)
*B22F 10/80* (2021.01)
*G06F 111/04* (2020.01)
*G06F 113/10* (2020.01)

(56) References Cited

U.S. PATENT DOCUMENTS

| | | |
|---|---|---|
| 2015/0154321 A1 | 6/2015 | Schmidt et al. |
| 2015/0251356 A1* | 9/2015 | Batchelder ............. B33Y 50/02 |
| | | 700/98 |
| 2016/0236407 A1 | 8/2016 | Armani et al. |
| 2016/0236414 A1* | 8/2016 | Reese .................... B33Y 50/02 |
| 2016/0280403 A1 | 9/2016 | Colson et al. |
| 2016/0370791 A1* | 12/2016 | Revanur ................ B33Y 50/02 |
| 2017/0173888 A1* | 6/2017 | Thomas-Lepore ..... H04L 51/52 |
| 2017/0173889 A1* | 6/2017 | Thomas-Lepore ... H04L 51/046 |
| 2017/0225402 A1* | 8/2017 | Batchelder ............. G06F 30/00 |
| 2017/0232515 A1* | 8/2017 | DeMuth ................. G06F 30/17 |
| | | 419/53 |

* cited by examiner

USER-ASSISTED PARTS PACKING OPTIMIZATION

BACKGROUND

Three-dimensional (3D) print technology is a type of additive manufacturing (AM) in which successive layers of a build material are deposited upon a target zone such as a build bed, generally with the aid of a computing device. Software executed by the computing device includes a precise specification of the part or parts to be printed during a given build.

Sometimes, a single part is to be printed. Often though, it makes sense to simultaneously build multiple parts in the build bed. Particularly where high yield is desired, it makes sense to fill the build bed with as many parts as possible. Parts packing is the practice of arranging parts to be 3D printed into a virtual "build volume" which is then sent to the 3D printer.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the examples described herein, a parts packing method is used to optimize build bed part placement for additive manufacturing. The method includes a user interface to parts packing software, enabling a user such as a process engineer to select parts from a pool of parts, group parts to have uniform orientation, and specify a range of angles and rotation of the parts. Additionally, the user interface accepts input related to process variations among different printers as well as drift over time of a single printer. The user interface feeds the data into the parts packing program to optimize build bed part placement.

Figure 1:
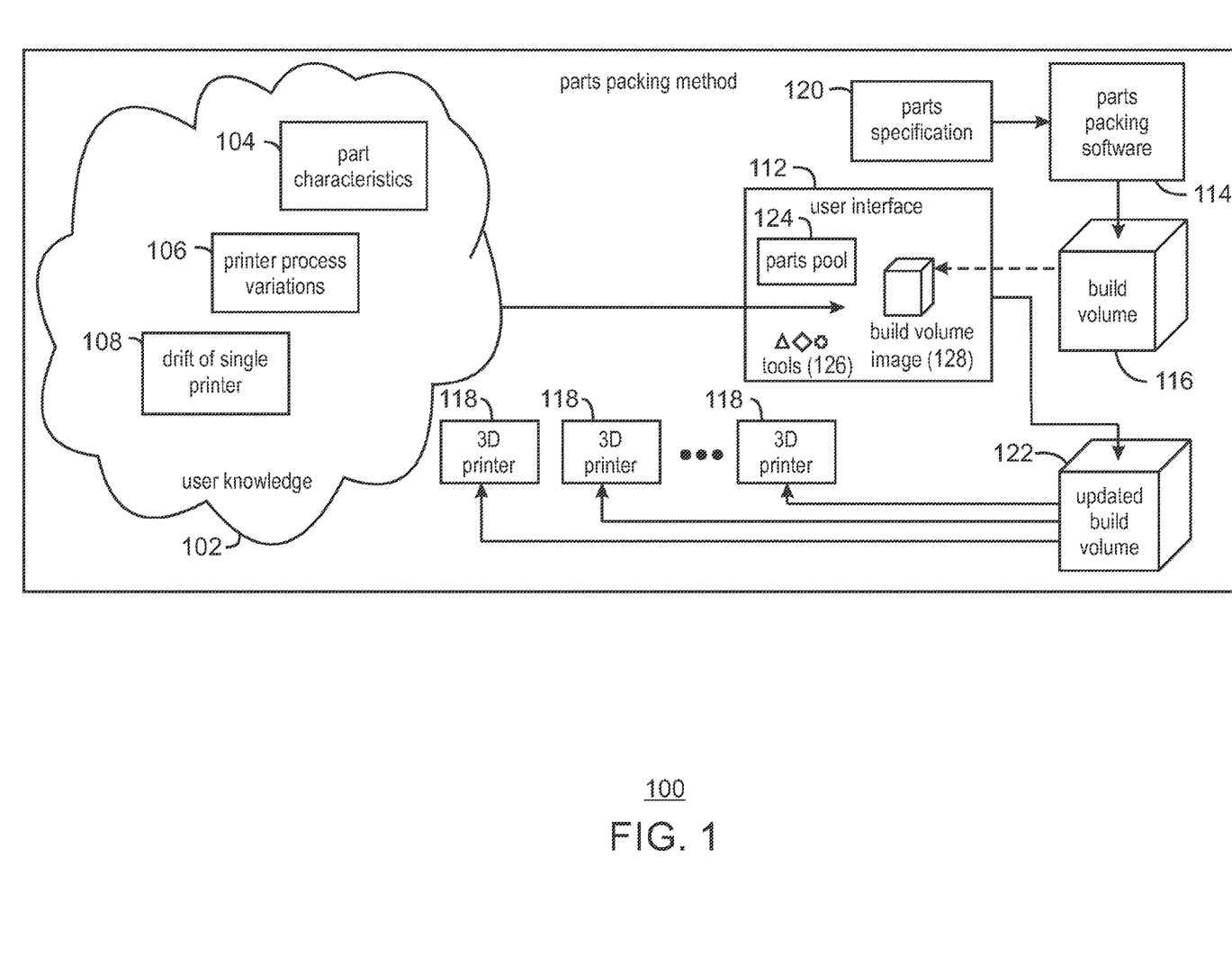
FIG. 1 is a schematic block diagram of a parts packing method, according to examples.

FIG. 1 is a schematic block diagram of a parts packing method 100, according to examples. The parts packing method 100 utilizes the expertise of a process engineer or other user to assist parts packing software 114, resulting in an updated, optimized build volume 122. As used herein, a process engineer is a person familiar with specific knowledge about the printer characteristics of one or more 3D printers as well as part characteristics of the parts to be 3D manufactured. In the example of FIG. 1, the printer characteristics of the 3D printers 118, are indicated as process variations between printers 106, and drift of a single printer 108. Further, based on the parts specification 120, the process engineer or other user is able to access her knowledge base 102 about the characteristics 104 of the parts to be manufactured.

Using this knowledge 102, a user interface 112 is accessed, such as by the process engineer or other user, to supply the user knowledge 102 to parts packing software 114. Further, via the user interface 112, an image 128 of an original build volume 116 generated by the parts packing software 114 may be accessed and manipulated, using both a parts pool 124 and tools 126, resulting in the updated build volume 122. The updated build volume 122, which is a 3D image is received as input to one or more of the 3D printers 118 as instructions to generate the 3D parts.

As used herein, parts packing software comprises software that receives as input information about multiple parts to be additive manufactured together in the same build volume. Using the parts specification 120, the parts packing software generates a build volume 116 to be optimized via the user interface 112. The parts specification 120 may be supplied to the parts packing software 114 via the user interface.

In additive manufacturing such as 3D printing, one goal is to ensure that each voxel forming the part goes through similar thermal experiences. This may minimize functional irregularities such as built-in thermal stress, which may result in warpage of the part. Thus, if multiple parts making up a single build volume or "lot" experience similar thermal journeys, uniformity of each part is more likely.

Figure 2:
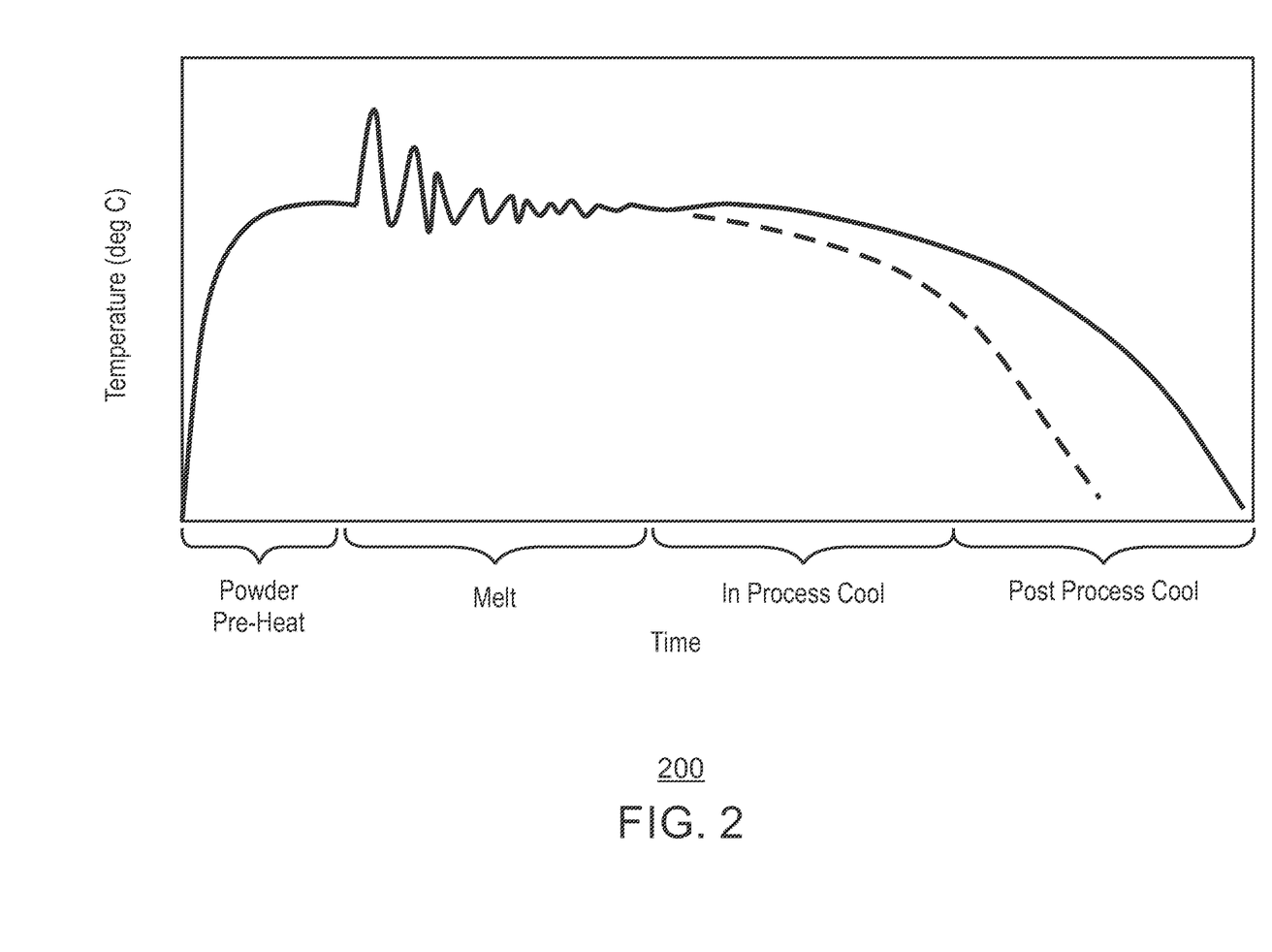
FIG. 2 is a diagram showing a graph of voxel thermal history, according to examples.

FIG. 2 is a diagram showing a graph 200 of voxel thermal history, according to examples. A voxel is a unit of graphical information defining a point in three-dimensional space. In the examples herein, the voxel represents a unit of the part to be 3D printed, where the part is one of many parts making up the build volume. The voxel may comprise a single material or a combination of materials, such as powder, powder with a binder material, powder with ink, liquid with binder, and so on, and the materials may be melted, fused, mixed, and so on.

In 3D printing, the voxel may experience several stages. Thus, in FIG. 2, along the x-axis, powder pre-heating, melting, in-process cooling, and post-process cooling are indicated, where the y-axis indicates a change in temperature of the voxel. The operations of FIG. 2 are merely examples and may vary in different types of additive manufacturing, and thus are not meant to limit the scope of the method 100 of FIG. 1. The graph 200 illustrates that a difference between cooling rates may change a voxel from being more ductile to being more brittle. Thus, the thermal experience of each voxel making up a build volume can diverge, and this divergence may be due to process variations between printers 106 or drift of a single printer 108 introduced in FIG. 1.

Parts packing software is designed to optimize the build volume for a given build. To drive up yield, for example, the parts packing software may do a good job for some builds. The yield refers to acceptable end-parts that meet the quality standards specified by the user. For example, multiple copies of the same part may be 3D printed. Some parts packing software include genetic algorithms to optimize part placement in a build volume and may receive inputs such as packing density and z-height.

Figure 3:
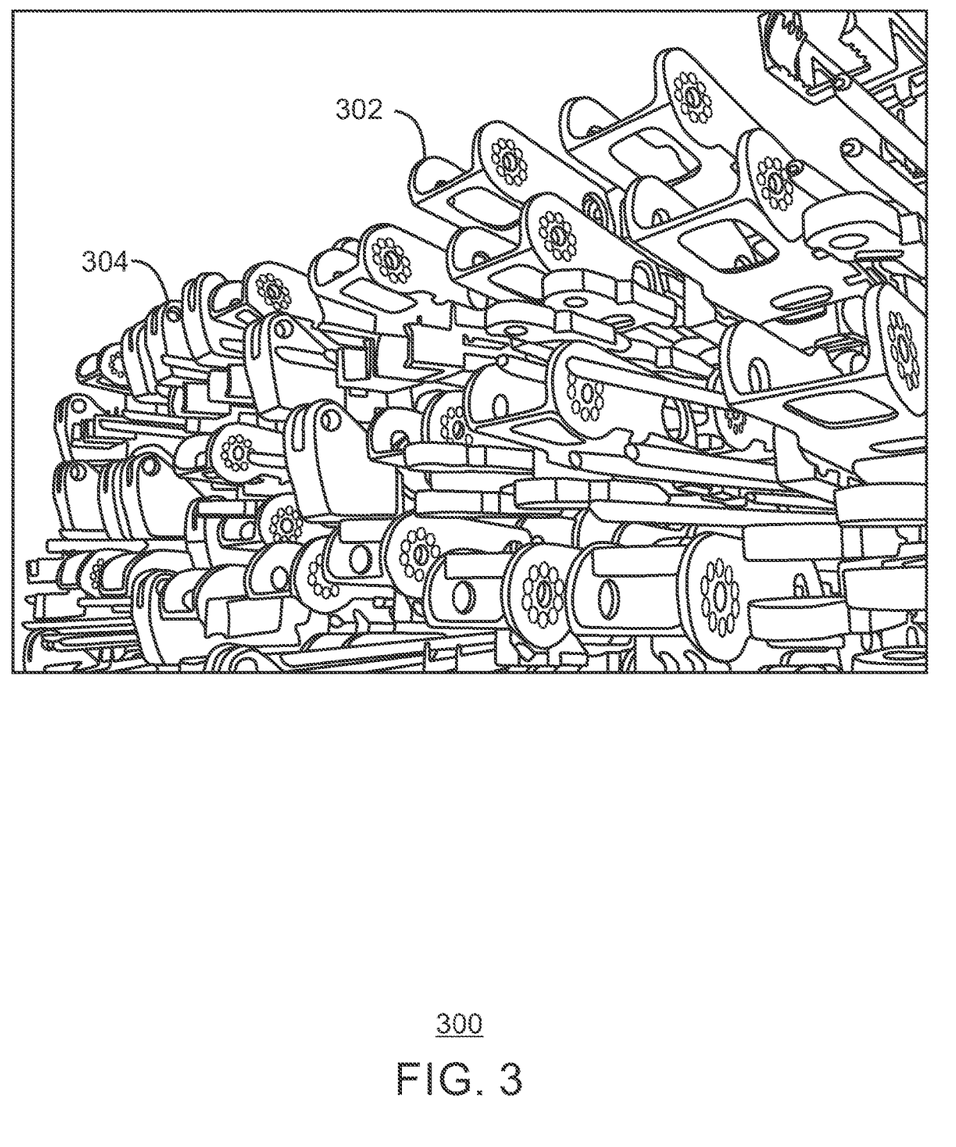
FIG. 3 is a build volume generated by parts packing software, according to examples.

FIG. 3 is a build volume 300 generated by parts packing software, according to examples. Multiple copies of least two different parts 302 and 304 make up the build volume 300 and the parts are pretty densely packed together. The part 302 is identical or nearly identical to other like parts, same with the part 304. Once these parts are 3D printed, if variations between like parts do exist, they are within a tolerance specified by the manufacturer of the part. The number of copies to be made for a given part may be in the hundreds, thousands or more.

In examples, the parts packing method 100 enables like parts to be constrained to the same orientation as one way to ensure the parts have similar thermal experiences. Additive manufacturing may involve directional differences, for example, the x-directional impact being different from the y-directional impact.

Anisotropicity is the concept of a material having uneven physical properties along different axes or views. Wood is an example of an anisotropic material. Currently available parts packing software fails to consider the anisotropicity of thermal experiences of a part or parts during build, process variations among different printers, and the drift over time about the same printer. The parts packing method 100 exploits the knowledge base 102 of the process engineer or other user to optimize the build volume 122 used to produce the 3D parts.

Process variations 106 of the 3D printers 118 may be the source of anisotropicity of a 3D printed part. For example, interior and downward-facing surfaces of a 3D printed part may be smoother than exterior and upward-facing surfaces (known as a staircase effect). Where the parts specification 120 indicates a preference for surface smoothness (or which is agnostic to surface smoothness), the additional knowledge 102 of process variations 106, such as the smoothness of a 3D printed surface, are part of the knowledge 102 of the user accessing the user interface 112.

Because 3D printers may have sizable machine-to-machine variation, and because a printer's thermal behavior may drift over time, the method 100 facilitates user-interactive computer-aided design/analysis. Via the user interface, input parameters reflecting current state of the printer may be selected.

One way to ensure that each part of a multiple-part build volume experiences similar thermal behavior is to manage the placement and orientation of each part in the build volume. It may be, for example, that the parts specification for the multi-part build volume has a small tolerance for differences in the 3D manufactured parts. Thus, placement and orientation of each part may be an additional constraint fed into the parts packing software, in some examples.

Figure 4:
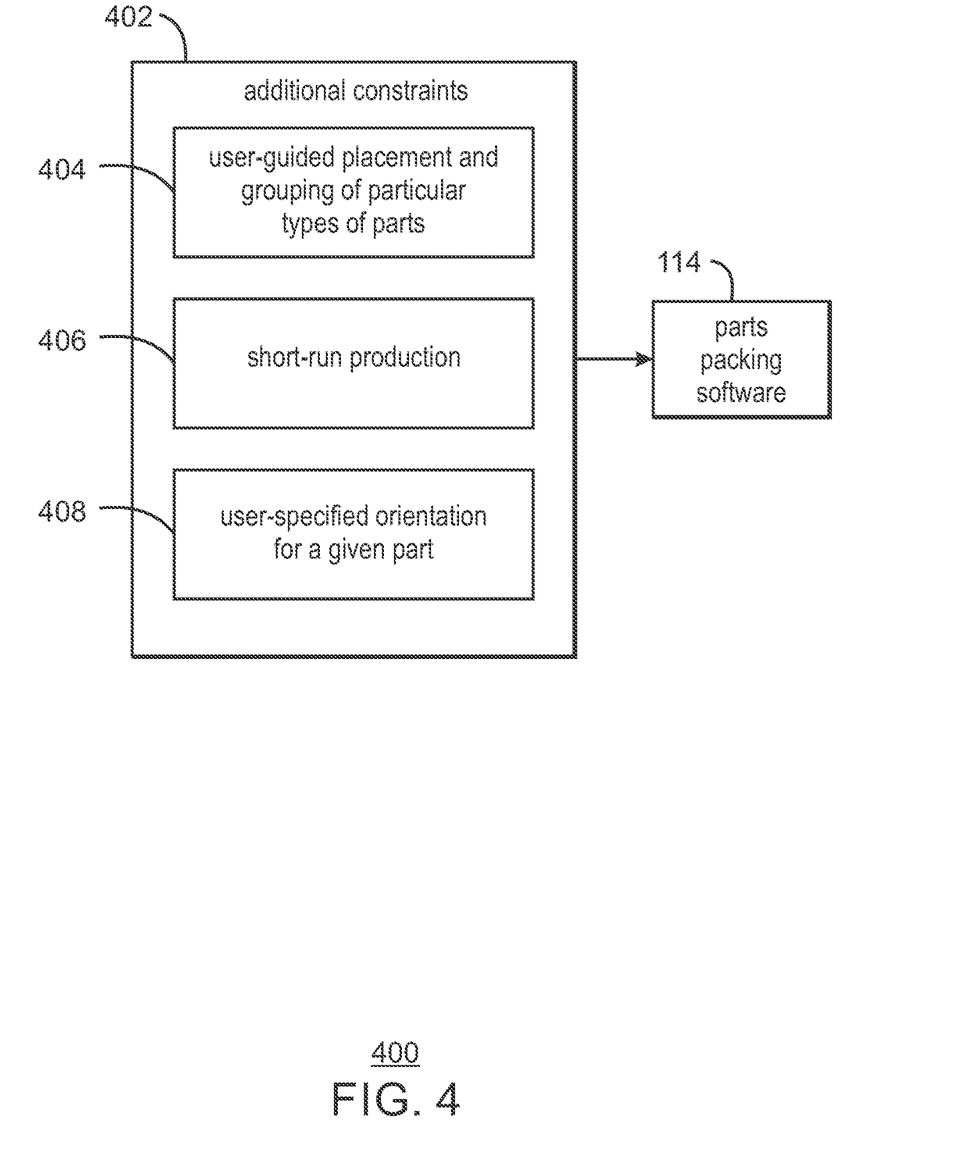
FIG. 4 is a simplified block diagram showing additional constraints to be received by the parts packing software of FIG. 1, according to examples.

FIG. 4 is a simplified block diagram 400 showing additional constraints 402 to be received by the parts packing software 114 of FIG. 1 by way of the user interface 112, according to examples. The additional constraints 402 are indicated as user-guided placement and grouping of particular types of parts 404, short-run production 406, and user-specified orientation for a given part 408. The additional constraints 402, which may be used by the parts packing method 100 of FIG. 1, are described in more detail below. The user-guided placement and grouping of particular types of parts 404 and the user-specified orientation for a given part 408 may be triggered by the part characteristics, 104, the printer process variations 106, or the drift of a single printer 108. Short-run production 406, by contrast, is about print economics. The process engineer may, for example, compute per-part cost in deciding which manufacturing methods to use. Short-run production favors 3D printing, in some examples.

Constraint 1. User-Guided Placement and Grouping of Particular Types of Parts

Figure 5A:
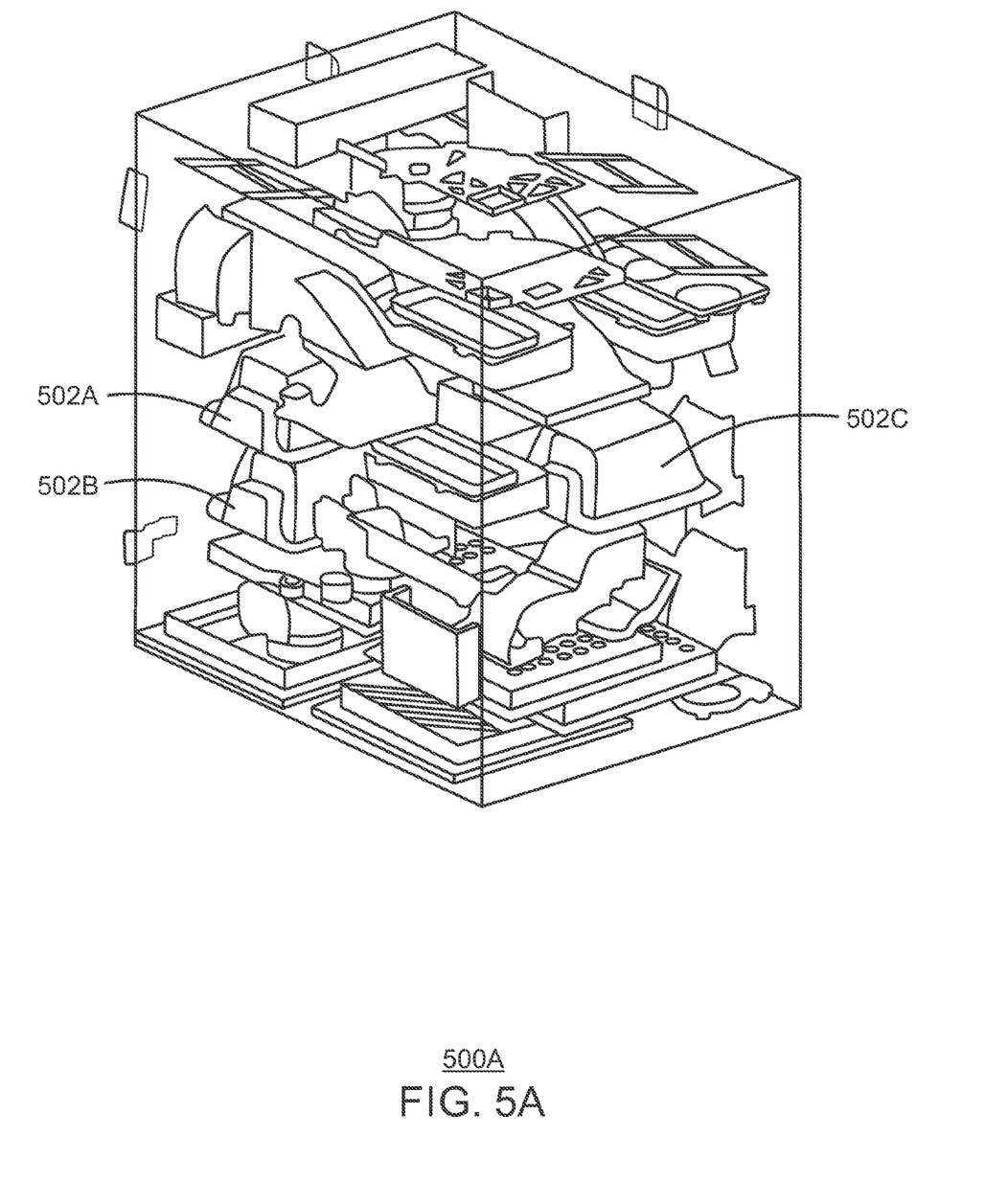
FIGS. 5A and 5B are build volumes, used to illustrate shortcomings that may be experienced using parts packing software, according to examples.
Figure 5B:
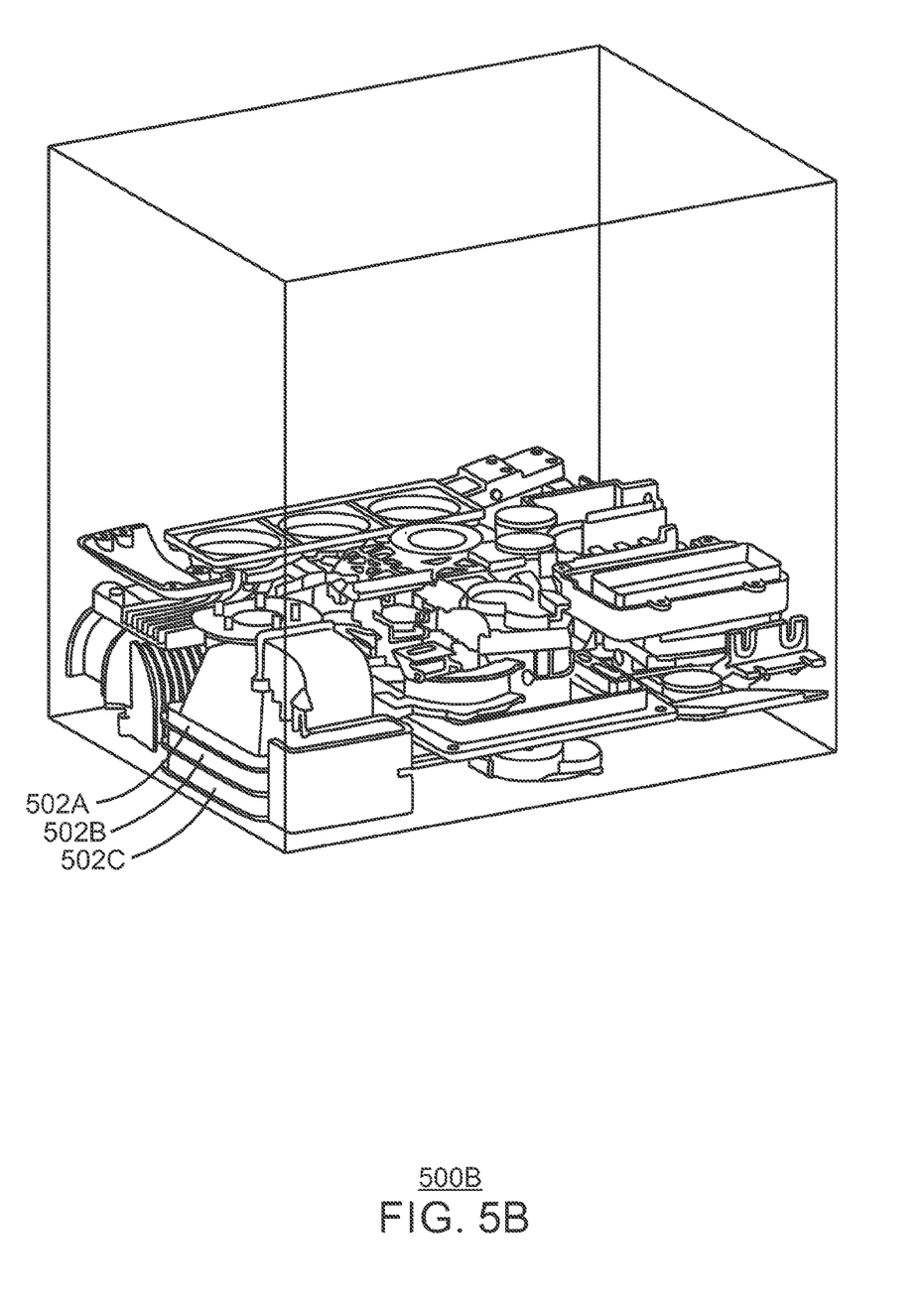

FIGS. 5A and 5B are build volumes 500A and 500B, used to illustrate shortcomings that may be experienced using parts packing software, in an example. FIG. 5A illustrates build volume 500A generated by a parts packing software. Within this build volume 500A, three identical or nearly identical structures, which may be called buckets 502A, 502B, and 502C (collectively, "buckets 502"). The buckets 502 have hollowed out interior portions that give them the property of being stackable within one another, like cups. Buckets that are stacked in a build volume have a higher packing density than those that are not, in examples. While readily observant to the human eyes, this stackability characteristic is not noted by the parts packing software and thus the buckets 502 are disposed in the build volume 500A are not stacked. This is so even though buckets 502A and 502B appear to be disposed over one another.

The build volume 500B, generated by the parts packing method 100 of FIG. 1, shows a different configuration. The build volume 500B also shows buckets 502A, 502B, and 502C, but this time, they are stacked over one another to optimize the build space. This is because the process engineer, experienced with 3D printing design considerations, feeds the information to the parts packing software as a constraint of how the software may arrange all the parts making up the build volume 500B. Stackable parts represent one type of part that user-guided placement and grouping, the first constraint 404 shown in FIG. 4, may be supplied as input via the user interface to the parts packing software.

Constraint 2. Short-Run Production

Figure 6:
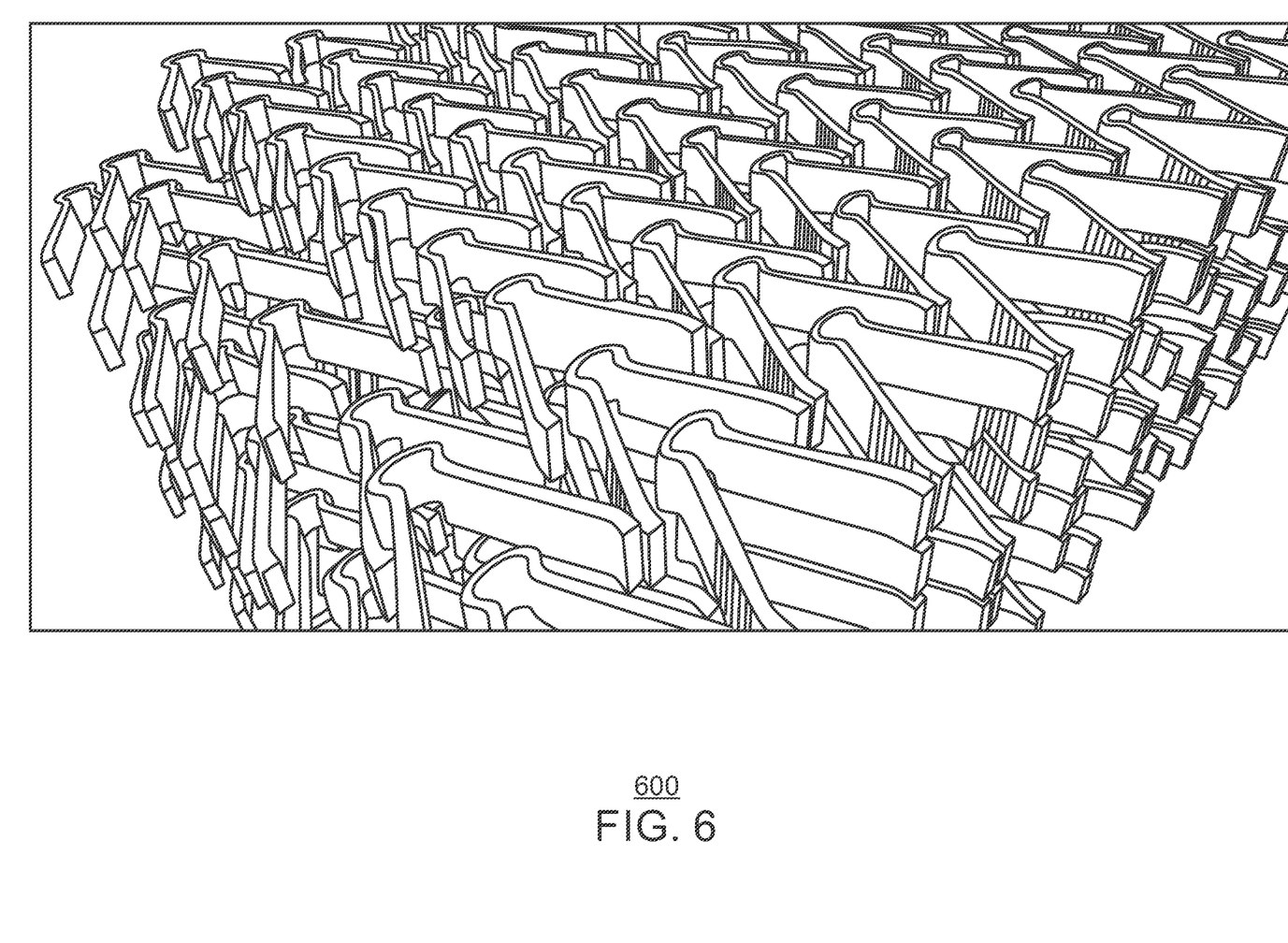
FIG. 6 is a diagram of a build volume in which similar parts are oriented in the same plane and same direction, according to examples.

FIG. 6 is a diagram of a build volume 600 in which similar parts, in this case, tweezers, are oriented in the same plane and same direction. In this case, having all parts in the same orientation is consistent with maximizing the packing density. In a production, one or more copies of the same design may be requested by the customer. If the customer requests 50,000 copies of the design, i.e., a long-run production job, in some examples, it is more economical to use conventional manufacturing means, such as injection molding, where the high start-up cost may be amortized over the many parts being produced. On the other hand, if the customer requests 500 copies, i.e., a short-run job, it is more economical, in some examples, to use digital manufacturing such as 3D printing, where the startup cost is minimal.

For short-run production, multiple copies of the same design are printed, in some examples. Process engineering tolerance of part functional performance (e.g., geometrical accuracy) usually is within a tighter band. By orienting the like parts similarly in the build volume, possible non-uniformity of thermal experiences between the parts may be avoided, in some examples. Otherwise, the parts may result in different functional properties, e.g., different anistropicity, as like parts of different orientation may experience a different thermal history.

In examples, the parts packing method 100, via the user interface 112, enables an orientation to be specified for identical parts making up the build volume. One solution is to tag the part with an identifier (ID) such that, when an orientation for the part is selected, other identical parts in the build volume will likewise have the selected orientation.

Constraint 3. User-Specified Orientation for a Given Part

One idea of constraint 2, above, is that, for all copies of the same design, the parts are handled in the same way, e.g., in the same orientation. For constraint 3, by contrast, an individual design may have more complex customer specifications. There exist use cases that in which the process engineer or other user may want to specify the allowed orientation of a given part, such as a boat. As an example, the user may prefer that the boat be printed upside down to keep the deck as an interior surface, while the bottom of the boat is printed as an exterior surface, such that the exterior is smooth. Preferred (or accepted) orientations of the part, from the perspective of the process engineer or other user, may be a range of angles rather than one particular angle.

Figure 7:
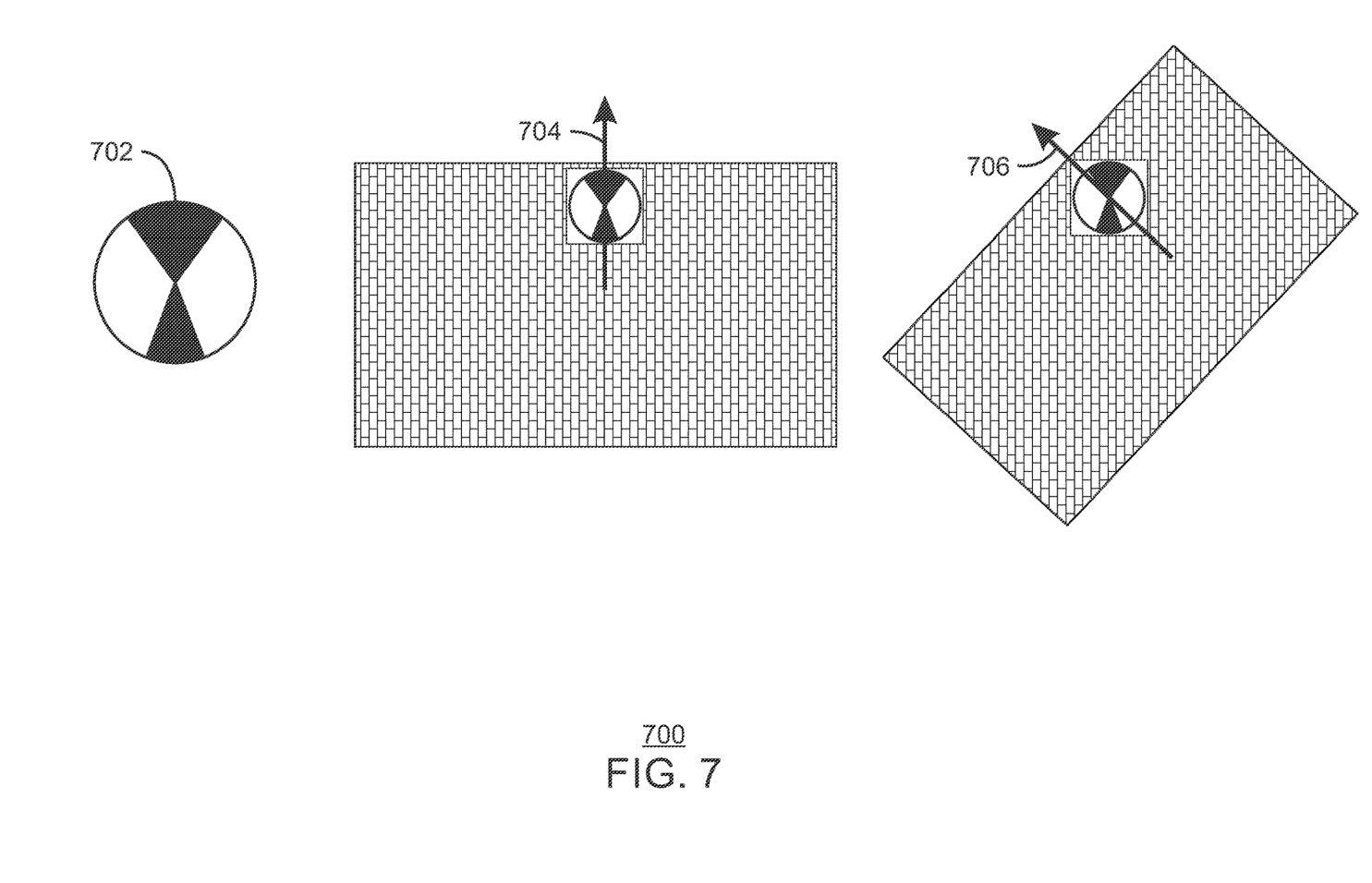
FIG. 7 is a diagram showing how a symbol may be used by the method of FIG. 1 to denote acceptable orientation of a part, according to examples.

FIG. 7 is a diagram 700 showing how a symbol 702 may be used by the method 100 to denote acceptable orientation of a part, according to examples. The "placement" of the symbol 702 onto a surface of the part may be specified, where the part is represented in the build volume 116, and the symbol 702 is positioned close to an edge of the part. Both the part and the symbol 702 are images displayed on the user interface. The normal of the edge in plane with the surface defines a vector. If the vector falls within the black zone of the symbol 702, the orientation is acceptable, but if the vector does not fall within the black zone, the orientation for that part upon which the symbol 702 is placed is improper.

In FIG. 7, the vector 704 falls within the black zone of the symbol 702, thus, the orientation is acceptable. The vector 706, however, does not fall within the black zone of the symbol 702, thus the orientation is not acceptable.

By recording information about how a part is to be fabricated onto the part itself (in this case, a symbol recording the orientation of the part placement), this allows reproduction of the part with the same quality at a later time.

Figure 8:
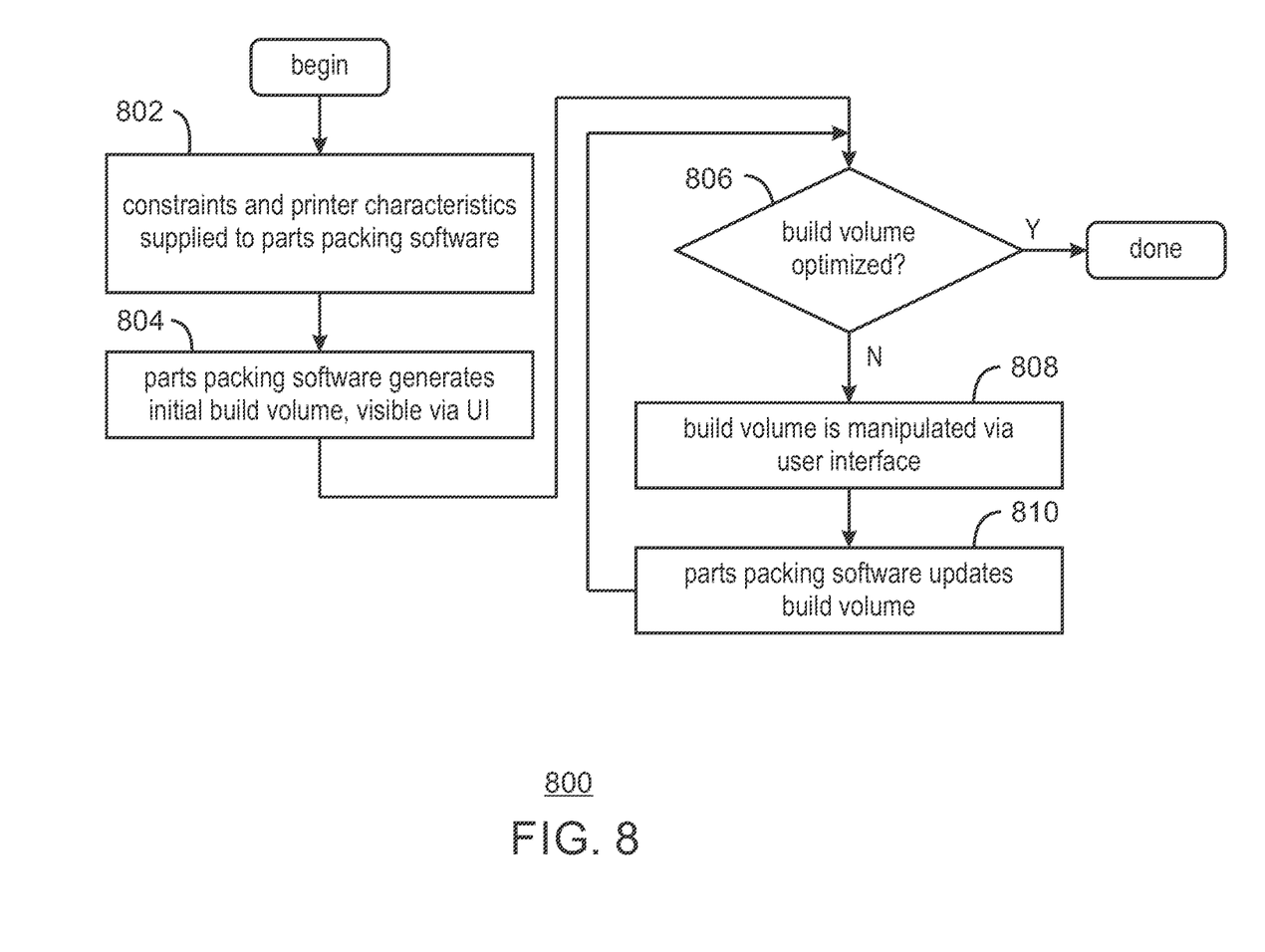
FIG. 8 is a flow diagram of operations that may be performed using the parts packing software in optimizing the build volume to be used to simultaneously 3D print a number of parts, according to examples.

Returning to FIG. 1, the user interface 112 of FIG. 1 provides the means by which the build volume 116 generated by the parts packing software 114 may be modified, resulting in the updated, optimized build volume 122. FIG. 8 is a flow diagram 800 showing operations that may be performed between the parts packing software 114 and the process engineer or other user in optimizing the build volume to be used to simultaneously 3D print a number of parts.

Via the user interface, constraints and printer characteristics to the parts packing software may be supplied (block 802). From this information, as well as the parts specification, the parts packing software generates the initial build volume of the parts to be printed (block 804). The image of the build volume is visible via the user interface. At this stage, if satisfied that the build volume is optimized (block 806), no further action is taken. Otherwise, the build volume may be manipulated via the user interface (block 808), such as selecting one or more parts of the build volume from the parts pool 124, and by using tools 126, such as assigning a part ID so like parts can be similarly manipulated, attaching an orientation to one or more parts, whether identical or not, and moving one or more like parts so that they may be stacked. The parts packing software then updates the build volume based on the input via the user interface (block 810). These processes may be repeated, as indicated, until the build volume is optimized.

The operations of FIG. 8 may take place in an order other than is indicated. For example, the parts packing software 114 may generate an initial build volume, such as the build volume 116 in FIG. 1, before receiving any user input.

Figure 9:
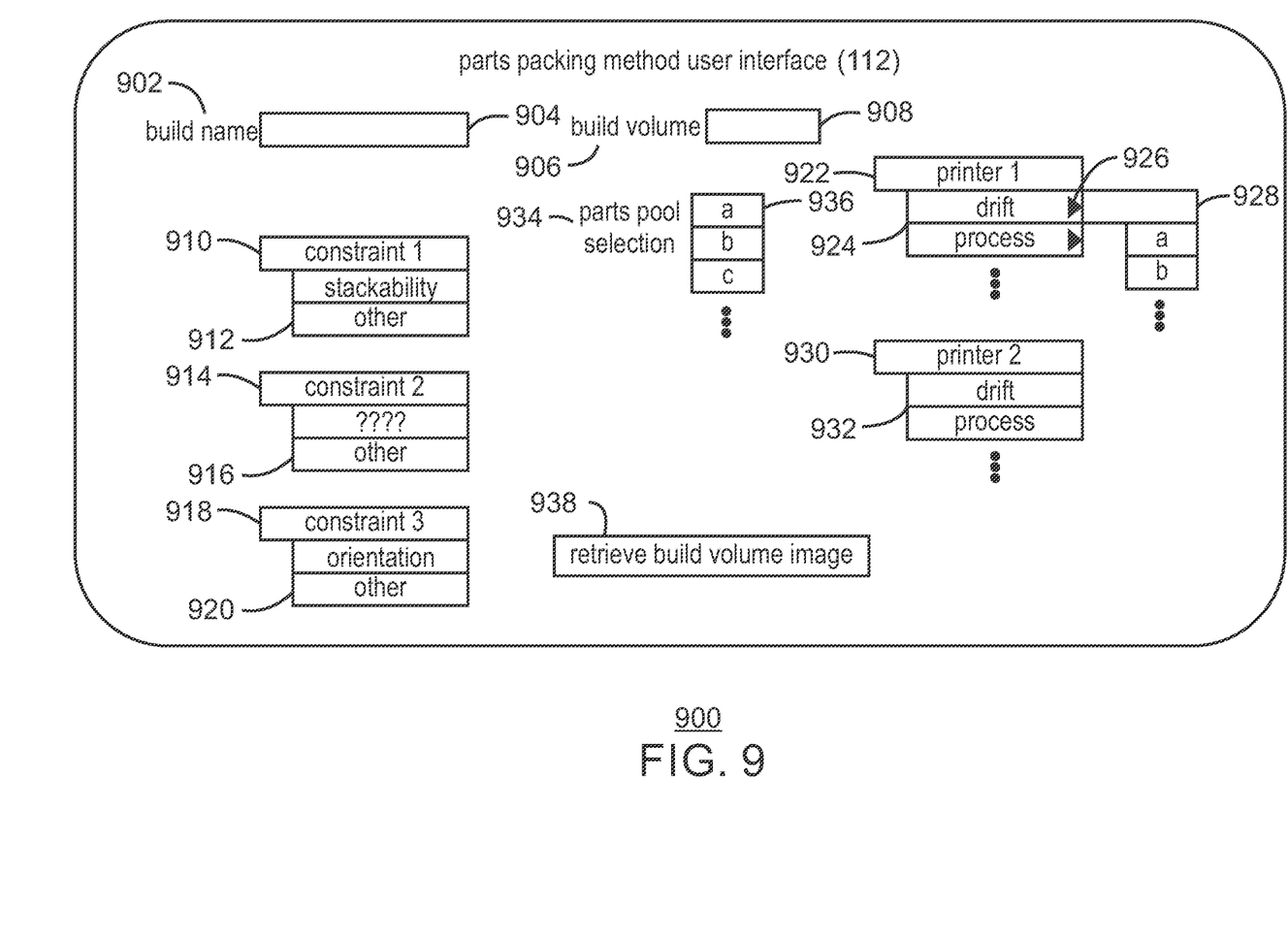
FIG. 9 is a simplified diagram of a user interface that is may be used by the method of FIG. 1, according to examples.

FIG. 9 is a simplified diagram 900 of the user interface 112 that is part of the method 100 of FIG. 1, according to examples. The user interface 112 may be presented to a display, such as a computer screen, of a processor-based system, as one example. The user interface 112 enables user knowledge such as characteristics about a part, printer process variations, and drift of a single printer, as well as useful constraints, such as the stackability of multiple parts making up the build volume, to be supplied to the parts packing software. The illustration 900 is merely representative of one type of user interface.

In the example user interface 112, user input such as build name 902 and build volume 906 are coupled to fillable text field boxes 904 and 908, respectively, for receipt of the build name and volume (e.g., how many parts are to be included in the build volume). Three constraint fields 910, 914, and 918 include respective pull-down menus 912, 916, and 920, as shown. The first constraint 910, for example, includes a stackability option. In other examples, the three constraints 910, 914, and 918 may instead be three different parts making up the build volume. In an example, the pull-down menus 912, 916, and 920 permit "other" to be selected and may further include a text box that enables the user to specify an unenumerated constraint or characteristic of the part.

The user interface 112 may also enable information about given printers to be specified. A printer 1 field 922 enables information about printer drift to be specified, for example. In the example of FIG. 9, additional information about the drift characteristic, given as a, b, . . . is selectable using additional pull-down menu 928 for any menu items featuring an arrow 926. The drift characteristic of printer 1 may have a default value, for example. The specifications for printer 2 in field 930 may be similarly used to provide information helpful to the parts packing software. As an example, the process field for each printer may provide a numerical indicator, which, relative, to the process field of the other printers, indicates the process variation between printers.

A parts pool selection field 934 enables one or more parts 936 to be selected from the parts pool 124 (FIG. 1). In some examples, the user interface 112 thus allows selection of multiple parts, such as the buckets 502 of FIGS. 5A and 5B, from the parts pool to be packed into the build volume. The selected parts enable those parts in the build volume to be manipulated.

Finally, in an example, the user interface 112 includes a retrieve build volume button 938. When selected, the information supplied via the user interface, is received by the parts packing software and either an initial or an updated build volume is generated. The build volume is visible on the user interface, and this enables placement of one or more parts in the build volume to be manipulated.

In an example, the user interface may be accessible via a mouse or by typing coordinates or other means, such that transition or rotation of a part in the build volume image is possible. In another example, the user interface allows translation and/or rotation of multiple parts such that these parts are placed relative to each other to achieve a minimal bounding volume. In this way, the buckets 502 of FIGS. 5A and 5B may be stacked tightly by manually placing them atop one another. Further, in one example, the user interface allows packed parts to be grouped into a single entity, such that the single entity may be packed with other parts by the parts packing software as if the grouped entity were a single part.

Web designers of ordinary skill in the art recognize a number of different schemes for implementing a suitable user interface to be used with the method 100. For example, the pull-down menus may instead be presented as a navigation bar from which the selections may be made. Or, pull-down menus may be replaced with slider bars to indicate drift within a range. Or, the pull-down menus may be presented on different pages. Or, information may be obtained by way of query-response menus. In examples, the user interface of the parts packing method 100 is simple to use and enables valuable information to be provided to facilitate generation of the build volume by the parts packing software. Further, the user interface may enable the constraints to be ranked or weighted so as to indicate their relative priorities.

Thus, using the parts packing method 100, back-end parts packing software accepts the user-specified constraints, as well as ranking and/or weights that signify their priorities to the user, then automatically generate pareto-optimal packing solution. Multiple packing solutions that optimize different aspects of the user's objectives, and/or trade-off different aspects of the user's constraints, may be presented to the user along with analyses values to allow a final selection of the build volume to be made.

Figure 10:
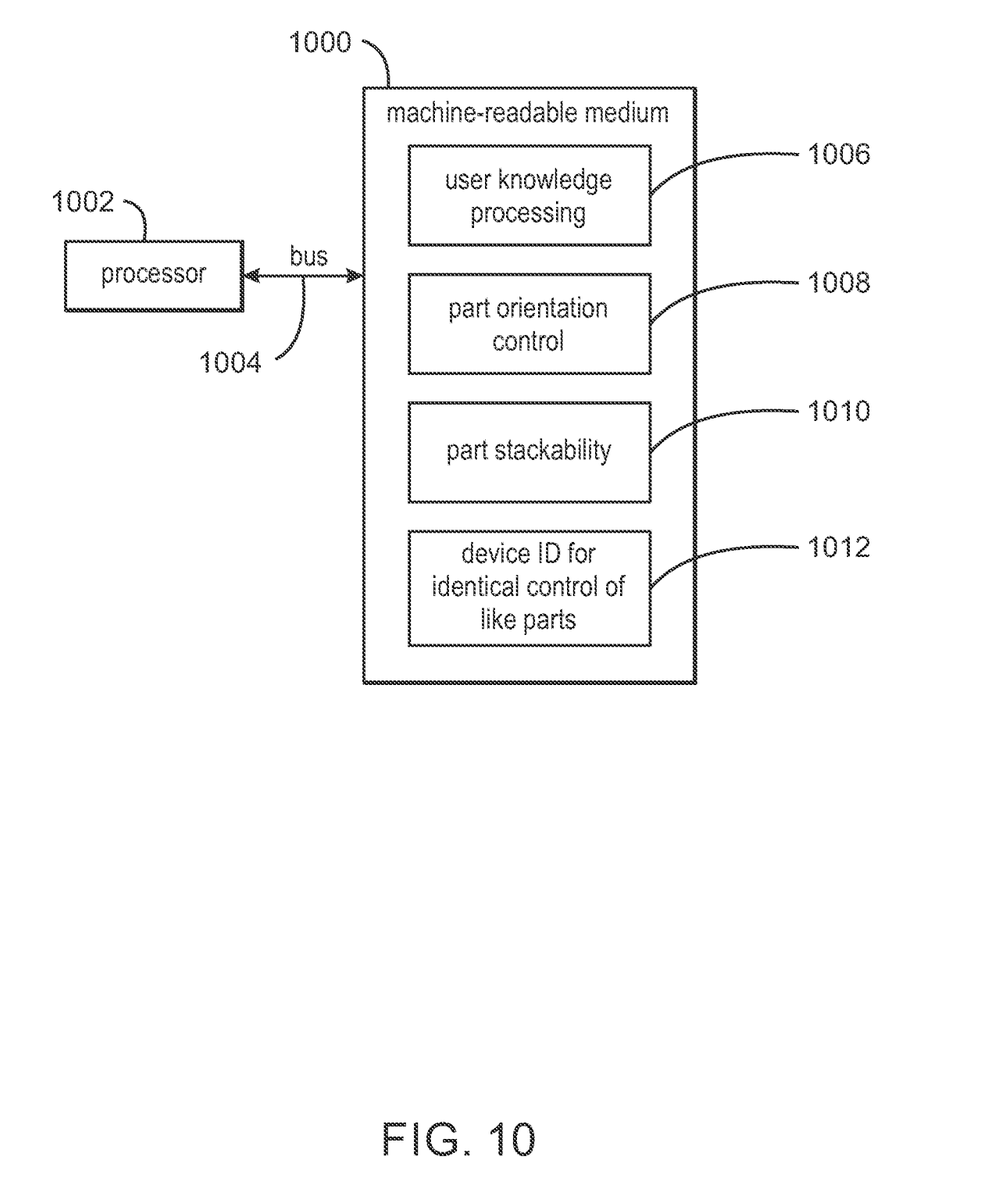
FIG. 10 is a block diagram of a non-transitory, machine-readable medium for performing the parts packing method, in accordance with examples.

FIG. 10 is a block diagram of a non-transitory, machine-readable medium 1000 for performing the parts packing method, in accordance with examples. A processor 1002 may access the non-transitory, machine readable medium over a reader mechanism, as indicated by arrow 1004.

The non-transitory, machine readable medium 1000 may include code to direct the processor 1002 to implement operations for performing the parts packing method of parts to be 3D printed. User knowledge processing 1006, for example, receives input about part characteristics such as anisotropicity, printer process variations, and printer drift, and supplies that information to the parts packing software to update the build volume, as described above. Part orientation control 1008 enables an orientation of a single part or multiple like parts to be specified, as described above, such that the part packing software is able to interpret the specification. Part stackability 1010 enables the one or more parts from the build volume to be selected and reoriented such that they are optimally stacked by the parts packing software, thus potentially increasing available space of the build volume and thus yield of the parts to be 3D printed. Device ID for identical control of like parts 1012 enables orientation of one part of a grouping of parts to be made, and have that orientation reflected by other parts of the group by the parts packing software.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

The invention claimed is:

1. A method comprising:
  receiving, by a parts-packing software, a request for a display of images of a plurality of parts in a new build volume;
  receiving, by the parts packing software, one or more constraints of a build volume via a user interface (UI), wherein the constraints include an orientation for identical parts making up the build volume, and wherein the build volume comprises images of the plurality of parts, at least some of which are identical to one another, the build volume be used during additive manufacture of the plurality of parts;
  determining, by the parts packing software, the new build volume based on the build volume, a packing density, a packing z-height, and the one or more constraints, wherein the packing density relates to how densely packed the plurality of parts are within the new build volume, and
  automatically displaying images of the plurality of parts in the new build volume via the user interface on a screen of a computing device based on the new build volume.

2. The method of claim 1, further comprising:
  tagging the identical parts of the plurality of parts; and
  specifying a range of angles of rotation of one of the identical parts;
  wherein the parts packing software limits the part and the tagged identical parts to the specified range of angles of rotation in the new build volume.

3. The method of claim 2, further comprising:
  identifying via the UI, at least two parts of the plurality of parts in the build volume that are stackable; and
  moving the at least two parts so as to be disposed atop one another and stacked in the new build volume.

4. The method of claim 2, further comprising:
  selecting the part from a parts pool.

5. The method of claim 1, further comprising specifying a printer characteristic of a printer, wherein the printer is to additive manufacture the part;
  wherein the parts packing software generates the new build volume based on the printer characteristic.

6. The method of claim 5, further comprising:
  affixing a symbol denoting an orientation to each of the plurality of parts.

7. The method of claim 5, wherein the printer characteristic comprises drift over time.

8. One or more non-transitory computer-readable storage media storing instructions that, when executed by one or more computing devices, cause the one or more computing devices to perform a specified method comprising:
  receiving a request for a display of a plurality of parts in a new build volume, by a parts-packing software, via a user interface to a parts packing software program, the user interface to enable a user to:
    supply an image of a build volume generated by the parts packing software program, wherein the build volume is a three-dimensional (3D) representation of a plurality of parts to be simultaneously 3D manufactured in a build bed; and
    enable manipulation of one or more of the plurality of parts in the build volume image, resulting in a modified build volume image, wherein the manipulation include manipulating placement of one or more of the plurality of parts based on a packing density, a packing z-height, and an orientation for identical parts in the modified build volume;
  determining, by the parts packing software, the new build volume by processing the modified build volume image by the parts packing software; and
  automatically displaying, by the parts packing software, the plurality of parts via the user interface on a screen of a computing device based on the new build volume.

9. The media of claim 8, further comprising:
a parts pool comprising the plurality of parts in the build volume; and
a symbol to be used with the image of the build volume, wherein the symbol is placed on an edge of a part of the plurality of parts, wherein the parts packing software program orients the part based on the symbol.

10. The media of claim 9, further comprising an identifier to group the part with other identical parts, wherein the parts packing software program orients the part and the other identical parts based on the symbol.

11. The media of claim 8, further comprising a stacking specifier to enable the user to stack the part, along with a plurality of similar parts, in the modified build volume image.

12. A non-transitory machine-readable medium having instructions stored therein that, in response to being executed on a computing device, cause the computing device to:
receive, by a parts-packing software, a request for a display of a plurality of parts in a new build volume;
receive, by the parts packing software, a build volume comprising images of the plurality of parts and constraints, wherein at least some of the images are identical to one another, wherein the build volume is to be used during additive manufacture of the plurality of parts, and wherein the constraints include an orientation for identical parts making up the build volume;
identify at least two parts of the plurality of parts in the build volume that are stackable;
determine, by the parts packing software, a modified build volume by moving the at least two parts so as to be disposed atop one another based on a packing density, a packing z-height, and the one or more constraints and stacked in the build volume;
generate, by the parts packing software, a new build volume based on the modified build volume; and
automatically display the plurality of parts via the user interface on a screen of a computing device based on the new build volume.

13. The machine-readable medium of claim 12, further having instructions stored therein that, in response to being executed on the computing device, cause the computing device to:
tag a subset of parts of the plurality of parts, wherein each part of the subset of parts is similar to each other part; and
orient one part of the subset of parts in a particular direction;
wherein the parts packing software automatically orients each part of the subset of parts in the particular direction when generating the new build volume.

14. The machine-readable medium of claim 12, further having instructions stored therein that, in response to being executed on the computing device, cause the computing device to generate the new build volume based on printer process variations received via the user interface.

15. The machine-readable medium of claim 12, further having instructions stored therein that, in response to being executed on the computing device, cause the computing device to generate the new build volume based on drift of a single printer received via the user interface.

16. One or more non-transitory computer-readable storage media storing instructions that, when executed by one or more computing devices, cause the one or more computing devices to perform a specified method comprising:
receiving a request for a display of a plurality of parts in a new build volume, by a parts-packing software, via a user interface to a parts packing software program, the user interface to enable a user to:
supply an image of a build volume generated by the parts packing software program, wherein the build volume is a three-dimensional (3D) representation of a plurality of parts to be simultaneously 3D manufactured in a build bed; and
enable manipulation of one or more of the plurality of parts in the build volume image, resulting in a modified build volume image, wherein the manipulation include an orientation for identical parts in the modified build volume, wherein a symbol is placed on an edge of a part of the plurality of parts, wherein the parts packing software program orients the part based on the symbol;
determining, by the parts packing software, the new build volume by processing the modified build volume image by the parts packing software; and
automatically displaying, by the parts packing software, the plurality of parts via the user interface on a screen of a computing device based on the new build volume.

* * * * *